US009092425B2

(12) United States Patent
Mirowski et al.

(10) Patent No.: US 9,092,425 B2
(45) Date of Patent: Jul. 28, 2015

(54) SYSTEM AND METHOD FOR FEATURE-RICH CONTINUOUS SPACE LANGUAGE MODELS

(75) Inventors: Piotr Wojciech Mirowski, New York, NY (US); Srinivas Bangalore, Morristown, NJ (US); Suhrid Balakrishnan, Scotch Plains, NJ (US); Sumit Chopra, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 936 days.

(21) Appl. No.: 12/963,161

(22) Filed: Dec. 8, 2010

(65) Prior Publication Data

US 2012/0150532 A1    Jun. 14, 2012

(51) Int. Cl.
*G06F 17/27*    (2006.01)
*G06F 17/28*    (2006.01)

(52) U.S. Cl.
CPC ..................................... *G06F 17/28* (2013.01)

(58) Field of Classification Search
CPC ..... G06F 17/27; G06F 17/20; G06F 17/2705;
G06F 17/271; G06F 17/2715; G06F 17/272;
G06F 17/2725; G06F 17/273; G06F 17/2735;
G06F 17/274; G06F 17/2745; G06F 17/275;
G06F 17/2755; G06F 17/276; G06F 17/2765;
G06F 17/277; G06F 17/2775
USPC ................................................... 704/1, 9, 10
See application file for complete search history.

(56) References Cited

U.S. PATENT DOCUMENTS

| | | | | |
|---|---|---|---|---|
| 5,479,563 | A | * | 12/1995 | Yamaguchi .................... 704/232 |
| 2003/0135356 | A1 | * | 7/2003 | Ying et al. ......................... 704/1 |
| 2009/0204605 | A1 | * | 8/2009 | Bai et al. ............................ 707/5 |
| 2009/0210218 | A1 | * | 8/2009 | Collobert et al. .................. 704/9 |
| 2011/0106743 | A1 | * | 5/2011 | Duchon ........................... 706/46 |

OTHER PUBLICATIONS

Son et al., Traning continuous space langauge models: some practical issues, Oct. 2010, ACL, pp. 778-788.*
Jelinek, A neural syntactic language model, Machine learning 60 (1-3), 2005, pp. 195-227.*
S. Katz, "Estimation of probabilities from sparse data for the language model component of a speech recognizer," IEEE Transactions on Acoustics, Speech and Signal Processing, vol. ASSP-35, No. 3, pp. 400-401, 1987.

(Continued)

*Primary Examiner* — Lamont Spooner (57) ABSTRACT

Disclosed herein are systems, methods, and non-transitory computer-readable storage media for predicting probabilities of words for a language model. An exemplary system configured to practice the method receives a sequence of words and external data associated with the sequence of words and maps the sequence of words to an X-dimensional vector, corresponding to a vocabulary size. Then the system processes each X-dimensional vector, based on the external data, to generate respective Y-dimensional vectors, wherein each Y-dimensional vector represents a dense continuous space, and outputs at least one next word predicted to follow the sequence of words based on the respective Y-dimensional vectors. The X-dimensional vector, which is a binary sparse representation, can be higher dimensional than the Y-dimensional vector, which is a dense continuous space. The external data can include part-of-speech tags, topic information, word similarity, word relationships, a particular topic, and succeeding parts of speech in a given history.

17 Claims, 3 Drawing Sheets

(56) References Cited

OTHER PUBLICATIONS

S.F.Chen et al., "An empirical study of smoothing techniques for language modeling," Proceedings of the Thirty-Fourth Annual Meeting of the Association for Computational Linguistics. 1996, p. 310-318, San Francisco: Morgan Kaufmann Publishers.

Y. Benigo et al., "A neural probabilistic language model." Journal of Machine Learning Research, vol. 3, pp. 1137-1155, 2003.

F. Morin et al., "Hierarchical probabilistic neural network language model," in Advances in Neural Information Processing Systems NIPS, 2005.

H. Schwenk et al., "Using continuous space language models for conversational speech recognition," in IEEE Workshop on Spontaneous Speech Processing and Recognition SSSRP, 2003.

H. Schwenk, "Continuous-space language models for statistical machine translation," The Prague Bulletin of Mathematical Linguistics, vol. 93, pp. 137-146, 2010.

J. Blitzer et al., "Hierarchical distributed representations for statistical language modeling," in Advances in Neural Information Processing Systems, 2004.

A. Mnih et al., "Three new graphical models for statistical language modeling," the $24^{th}$ International Conference on Machine Learning ICML, 2007, pp. 641-648.

A. Mnih et al., "A scalable hierarchical distributed language model," in Advances iu Neural Information Processing Systems NIPS, 2008.

A. Mnih et al., "Improving a statistical language model through non-linear prediction," Neurocomputing, vol. 72, No. 7-9, pp. 1414-1418, 2009.

R. Collobert et al., "A unified architecture for natural language processing: deep neural networks with muititask learning," in ICML '08: Proceedings of the $25^{th}$ international conference on Machine learning, 2008, pp. 160-167.

R. Sarikaya et al., "Continuous space language modeiing technique," in IEEE International Conference on Acoustics, Speech and Speech Processing ICASSP, 2010, pp. 5186-5189.

T. Griffiths et al., "Integrating, topics and Syntax," in Advances in Neural Information Processing Systems, 2005.

Y. Lecun et al., "A tutorial on energy-based learning," in Predicting Structured Outputs, 2006, MIT Press.

Y. Lecun et al., "Efficient backprop.", in Lecture Notes in Computer Science. 1998, Berlin/Heidelberg: Springer.

P. Resnik, "Semanic similarity in a taxonomy: An information-based measure and its application to problems of ambiguity in natural language," Journal of Artifical Intelligence Research, vol. 11, pp. 95-130, 1999.

D. Blei et al., "Latent dirichlet allocation," Journal of Machine Learning Research vol. 3, pp. 993-1022, 2003.

A. Stolcke, "Srilm-an extensible language modeling toolkit," in $7^{th}$ International Conference on Spoken Language Processing ICSLP, 2002, pp. 901-904.

P. Mirowski et al., "Dynamic factor graphs for time series modeling," in European Conference on Machine Learning ECML, 2009.

\* cited by examiner

SYSTEM AND METHOD FOR FEATURE-RICH CONTINUOUS SPACE LANGUAGE MODELS

BACKGROUND

1. Technical Field

The present disclosure relates to language modeling and more specifically to using continuous space language models for predicting a next word in a sentence, for improving speech recognition, or for improving other speech processing tasks.

2. Introduction

A key problem in natural (both written and spoken) language processing is designing a metric to score sentences according to their well-formedness in a language, also known as statistical language modeling. The current state-of-the art techniques called n-gram models require exponentially more data as the size of history increases. N-gram language models typically use a Markov approximation that assumes that the probability of a word $w_t$ depends only on a short fixed history $w_{t-n+1}^{t-1}$ of n−1 previous words, and the joint likelihood of a sequence of T words is given by:

$$P(w_1^T) = P(w_1^{n-1}) \prod_{t=n}^{T} P(w_t | w_{t-n+1}^{t-1}) \quad \text{Equation 1}$$

In order to overcome this sparsity, some approaches incorporate back-off mechanisms to approximate nth order statistics with lower-order ones and to approximate sparse or missing probabilities by smoothing. In contrast to the discrete n-gram models, the recently-developed Continuous Statistical Language Models (CSLM) embed the words of the |W|-dimensional vocabulary into a low-dimensional and continuously valued space $\mathfrak{R}^{|Z|}$, and rather than making predictions based on the sequence of discrete words $w_t, w_{t-1}, \ldots, w_1$ operate instead on the sequence of embedded words $z_t, z_{t-1}, \ldots, z_1$. The advantage of such models over discrete n-gram models is that they allow for a natural way of smoothing for unseen n-gram events. Furthermore, the representations for the words are discriminatively trained in order to optimize the word prediction task. However even these continuous statistical language models include certain drawbacks.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure presents a way to represent a word in a low dimension space using continuous values. This approach provides a way to define neighborhoods of words as well as incorporate linguistic features more naturally. The disclosed CSLM model can efficiently use word meta-features such as part-of-speech tags. The CSLM model is also flexible enough to handle long-range features such as those derived from topic models. Thus, in essence the disclosed CSLM model and its architecture can synthesize and extend many of the strengths of the state-of-the-art CSLMs. While language modeling is one task and perplexity is one potential evaluation metric, the CSLM model can also be evaluated based on word accuracy for speech recognition. The architecture disclosed herein can exploit linguistic features and discourse context in a unified framework that is faster and more accurate in a word prediction task.

State-of-the-art probabilistic models of text such as n-grams require an exponential number of examples as the size of the context grows, a problem that is due to the discrete word representation. The approaches set forth herein can solve this problem by learning a continuous-valued and low-dimensional mapping of words, and basing predictions for the probabilities of the target word on non-linear dynamics of the latent space representation of the words in a context window. Neural networks-based language models can be expressed as energy-based models. The system can further enrich models with additional inputs such as part-of-speech tags, topic information and graphs of word similarity. These approaches demonstrate a significantly lower perplexity on different text corpora, as well as improved word accuracy rate on speech recognition tasks, as compared to existing back-off n-gram-based language models.

Disclosed are systems, methods, and non-transitory computer-readable storage media for predicting probabilities of words for a language model. A system practicing the method first receives a high-dimensional representation of a sequence of words and external data associated with the sequence of words. Then the system processes the sequence of words and the external data using a linear function to generate a low-dimensional mapping of the sequence of words. Once the mapping is complete, the system passes the continuous representation, including external data such as part-of-speech tagging, through a nonlinear representation function to generate a representation of the next word. That representation is used to compute the probabilities of the words in the vocabulary. The external data can include part-of-speech tags, topic information, word similarity, a distribution of word relationships, a distribution based on a particular topic, and/or a distribution of possible succeeding parts of speech in a given history. The system generates probabilities of each word in a vocabulary based on the low-dimensional mapping and outputs a list of predicted words as part of a language model based on the probabilities. The output can be in visual form, in the form of a data file, a statistical report, and/or some other desired output format.

The list of predicted words can be used for a variety of different natural language applications, such as part-of-speech tagging, spelling correction, language generation, and speech recognition. Further, the continuous statistical language model can be based on a long-range dependency of a current topic according to a paragraph level and/or document level.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for predicting probabilities of target words. A brief introductory description of a basic general purpose system or computing device in FIG. 1 which can be employed to practice the concepts is disclosed herein. A more detailed description of the principles, architecture, and experimental data will then follow. These variations shall be discussed herein as the various embodiments are set forth. The disclosure now turns to FIG. 1.

Figure 1:
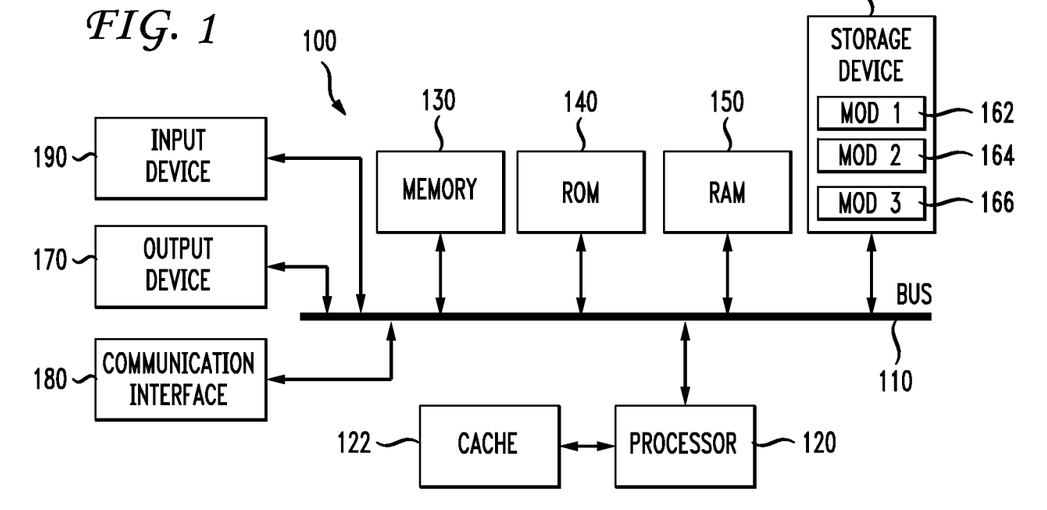
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

The disclosure returns to a discussion of continuous statistical language models (CSLMs) and their application in predicting the probability of a next word in a vocabulary. The best-known CSLM is the Neural Probabilistic Language Model (NPLM), which includes a neural network that takes as input a window of word embedding history $z_{t-n+1}^{t-n}$ and is trained to directly predict the probability of the next word $w_t$ for the entire vocabulary. Trainable parameters of this system can include the word embedding function that describes how words $w_t$ are projected to their low-dimensional representations zt, as well as the network combination weights that describe how the z's in the context are combined to make the prediction.

The approaches set forth herein include a non-linear architecture, i.e. a single hidden layer neural network, trainable embedding, and a Log-BiLinear (LBL) architecture, i.e. a probabilistic energy-based model that is trained to predict the embedding $\bar{z}_t$ of the next word $w_t$. Some key elements of the LBL architecture are explained below. LBL models can outperform n-gram language models.

Other nonlinear classifiers such as hierarchical logistic regression or state-space models (Tied-Mixture Language Models) used for CSLM can initialize the word representation by computing a square word co-occurrence matrix (bigrams) and reducing its dimensionality through Singular Value Decomposition to the desired number of latent factors |Z|.

This disclosure also includes a major extension of the LBL model that incorporates part-of-speech tag features as additional inputs. However, this extension can address different supervised NLP tasks other than language modeling. In one aspect, the system takes in to account long-range dependencies between words in the current sentence, one or more previous sentences, and/or in the current document. For this reason, the system can integrate CSLM with text topic models.

Figure 2:
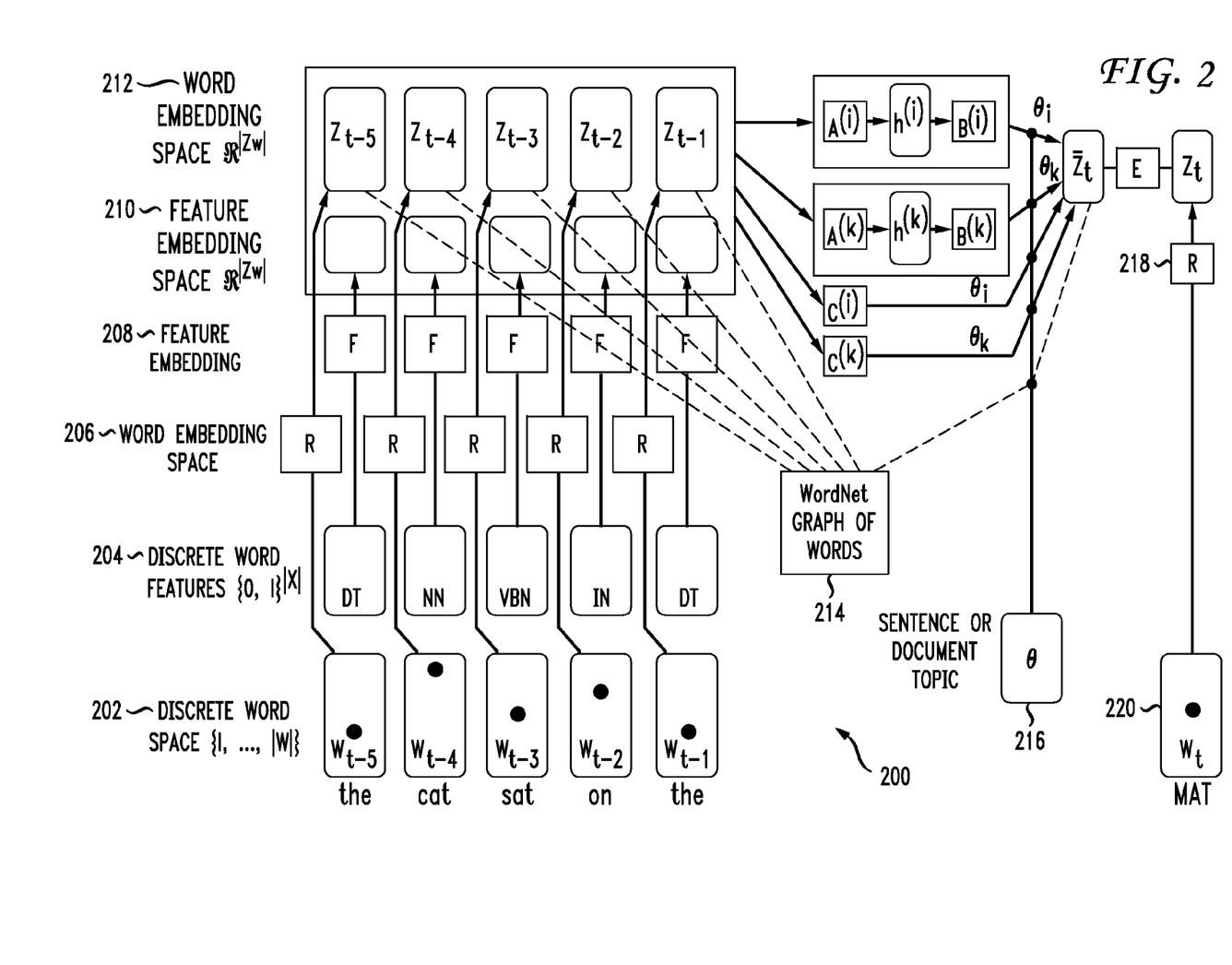
FIG. 2 illustrates an exemplary enhanced log-bilinear architecture.

Having disclosed some components of a computing system and some foundational principles, the disclosure now turns to a discussion of an exemplary enhanced log-bilinear architecture 200, as shown in FIG. 2. Given a word history $w_{t-n+1}^{t-1}$ in a discrete word space 202, the architecture 200 produces a low-dimensional embedding $z_{t-n+1}^{t-1}$ using R. The low-dimensional embedding can include multiple phases, such as a word embedding phase 206 that places words in a word embedding space $\Re^{|Z_W|}$ 212, and a feature embedding phase 208 that combines discrete word features 204 with the words in a feature embedding space $\Re^{|Z_X|}$ 210. The architecture 200 can feed the low-dimensional embedding into a linear C matrix and a non-linear (neural network) architecture (parameterized by A and B) to produce a prediction $\bar{z}_t$, based on R 218, $w_t$ 220, the word embedding space 212, and the feature embedding space 214. If the architecture uses a topic model 218 with k topics, the predictor becomes a mixture of K modules, controlled by topic weights $\theta_1, \ldots, \theta_K$ for each sentence or document topic 216. The sentence 216 can be a current sentence or document, or recent/related sentences or documents. The topic model 218 can be a Latent Dirichlet Allocation (LDA) model. The architecture 200 then compares that prediction to the embedding of all words in the vocabulary using a log-bilinear loss E that is normalized to give a distribution. The architecture can embed Part-of-Speech features using matrix F, alongside the words.

In one variation, a Continuous Statistical Language Model (CSLM) tries to compute the probability distribution of the next word in a sequence using the distributed representation of the preceding words by capturing the dependencies/interactions between the distributed representation of the next word and the distributed representations of the preceding words in the sequence. The CSLM can define an energy function (a cost) between the variables that captures these dependencies. Learning in such models can involve adjusting the parameters such that low energies are assigned to the valid sequences of words and high energies to the invalid ones. The architecture can do this by maximizing the likelihood of the training corpus.

In a Log-Bilinear Language (LBL) Model, a discrete word sequence of length T is denoted by $w_1^T = [w_1 \ldots w_T]$, and its corresponding low dimensional real-valued representation is denoted as $z_1^T = [z_1 \ldots z_T]$ where $\forall t, z_t \in \Re^{|Z|}$. The LBL model tries to predict the distributed representation of the next word $z_t$, using a linear function of the distributed representations of the preceding words $z_{t-n+1}^{t-1}$, where $z_{t-n+1}^{t-n}$ denotes a stacked history of the previous word embedding (a vector of length $(n-1)|Z|$:

$$\bar{z}_t = C z_{t-n+1}^{t-1} + b_c = fc(z_{t-n+1}^{t-1}) \quad \text{Equation 2}$$

Matrix C is a learnable parameter matrix that expresses the bilinear interactions between the distributed representations of the previous words and the representation of the current word. The vector $b_C$ is the corresponding vector of biases. For any word $w_v$ in the vocabulary with embedding $z_v$, the energy associated with respect to the current sequence is a bilinear function and is given by the following equation:

$$E(t,v) = -\bar{z}_t^T z_v - b_v \quad \text{Equation 3}$$

This energy expresses the similarity between the predicted distributed representation of the current word and the distributed representation of any other word $w_v$ in the vocabulary. The similarity is measured by the dot product between the two representations. Using these energies, the system can assign the probabilities to all the words $w_v$ in the vocabulary as shown below:

$$P(w_t = w_v \mid w_{t-n+1}^{t-1}) = \frac{e^{-E(t,v)}}{\sum_{v'=1}^{|W|} e^{-E(t,v')}} \quad \text{Equation 4}$$

Training of LBL model can involve iterating through the entire data set and maximizing, for each target word $w_t$, its likelihood, i.e. minimizing the negative log likelihood loss $L_t$:

$$L_t = E(t, v) + \log \sum_{v'=1}^{|W|} e^{-E(t,v')} \quad \text{Equation 5}$$

Turning to non-linear extension of LBL, to LBLN, the LBL model as described above is capable of capturing only linear interactions between representations of the previous words and the representation of the next word, conditioned on the matrix C. However, expressing linear interactions as an energy-based model allows the system to add more complex interactions among the representations just as easily by increasing the complexity of the energy function. For instance, the system can capture non-linear dependencies among the representations of the previous words, and the next word by adding a single hidden layer neural network. For example, matrices A and B are the two learnable parameter matrices and the vectors $b_A$ and $b_B$ are the corresponding biases. The tan h sigmoid transfer function is denoted by $\sigma$ and the set of hidden layer outputs by h. Then the prediction given by this nonlinear component, which captures non-linear dependencies among representations, is given by the following equation:

$$f_{A,B}(z_{t-n+1}^{t-1}) = B_\sigma(A z_{t-n+1}^{t-1} + b_A) + b_B \quad \text{Equation 6}$$

Then, prediction by both the linear and the non-linear component of the LBL (LBLN) is given by merely the sum of the two terms:

$$\bar{z}_t = f_{A,B}(z_{t-n+1}^{t-1}) + f_C(z_{t-n+1}^{t-1}) \quad \text{Equation 7}$$

The energy of the system is defined in the same way as in Equation 3, and the loss function is defined in the same way as in Equation 5. The system is again trained by maximizing the likelihood of the training corpus.

The disclosure turns now to training the LBLN model. Some exemplary training settings are, for example, setting the dimensions of the distributed representation of words to $|Z|=100$, and the number of hidden units in the neural network to 500. Other values, higher and/or lower, are acceptable and can be tailored to a specific application, performance attributes, and so forth.

As mentioned above, training of LBLN can involve maximizing the log-likelihood of the target words in all the sequences of the training set, which is achieved by minimizing the negative log-likelihoods, as shown in Equation 5, at each word. The system can minimize the negative log-likelihoods via a stochastic gradient descent procedure on minibatches of words, such as batches of 1,000 words. Typically, Equation 5 is differentiated with respect to the prediction $\bar{z}_t$, the target word representation $z_w$ and the other word representations $z_v$, and the gradients are propagated through the linear C and nonlinear A,B modules up to the word representations R themselves, as well as to the respective biases. The system can add an additional weight momentum $\mu$ to all parameters. In addition, the word embedding R, and all weight matrices (but not the biases) may be subject to L2-norm regularization. Table 1 summarizes the various hyper-parameter values optimized by cross-validation on a small dataset.

TABLE 1

| $\eta_C$ | $\eta_A$ | $\eta_B$ | $\eta_R$ | $\eta_F$ | $\lambda$ | $\mu$ | $\gamma$ |
|---|---|---|---|---|---|---|---|
| $10^{-3}$ | $10^{-1}$ | $10^{-5}$ | $10^{-4}$ | $10^{-4}$ | $10^{-5}$ | 0.5 | 1 |

All the parameters A, B, C, R can be initialized randomly. As a rule of thumb, generating zero-mean normally distributed words of variance is roughly equal to the inverse of the matrix fan-in. Biases can be initialized to zero, with the exception of $b_v$, which are initially equal to the unigram statistics of the training data. Some CSLM architectures are however dependent on the initial latent word representation. This dependency can be evaluated by computing a bi-gram co-occurrence matrix $O = \{O_{w_p, w_{t-1}}\} \in \Re^{|W| \times |W|}$ over the words in the training data and retrieving a $|Z|$-dimensional embedding of O through Singular Value Decomposition (SVD), as shown in Equation 8. One example uses the forward term $R \in \Re^{|Z| \times |W|}$ as shown in Equation 9, where each column or word is represented in terms of a $|Z|$-dimensional influence of the past word $w_{t-1}$ on the current word $w_t$.

$$O = U \Sigma V^T \quad \text{Equation 8}$$

$$R = (U \Sigma)^T \quad \text{Equation 9}$$

Alternatively, the system can initialize R using an SVD of the n-gram co-occurrence matrix $O = \{O_{w_p, w_{t-n+1}^{t-1}}\} \in \Re^{|W| \times n|W|}$.

The disclosure now turns to various extensions to the NLBL model. One extension relates to graph constraints on latent word representations. The low-dimensional nature of the word embedding in CSLMs ($|Z| \ll |W|$, with $|Z|=100$ and $|W|$ typically over 10,000) and the word co-occurrence in the text tend to cluster word representations $z_w$ according to their syntactic co-occurrence and semantic equivalence. In order to speed-up the learning of the model and to potentially help achieve better performance, the system can impose a graph constraint on the words. For each word w, the system can define a word neighborhood $N_w$ obtained through the hierarchical WordNet2 tree and using the WordNet::Similarity module. Specifically, the system can use the information theoretical-built Resnik similarity, keeping in $N_w$ only words whose Resnik score was higher than 8 or some other suitable threshold. During learning time, the system can impose the graph constraint by adding the following $L_2$-norm penalty to the total log-likelihood:

$$L_{graph} = \lambda \sum_{w=1}^{|W|} \left\| z_w - \frac{1}{|N_v|} \sum_{v \in N_w} z_v \right\|_2^2 \quad \text{Equation 10}$$

Another extension relates to incorporating part-of-speech tag features. One important improvement over LBL and LBLN is the addition of Part-of-Speech (POS) tags to each word. Conceptually, this step is identical to the word embedding. For each word, the system maps discrete POS tags (for example, out of a vocabulary of $|X|$, between 30 and 52) into a low-dimensional embedding $\Re^{|Z_X|}$ through a linear operation (matrix F). The matrix F can be initialized randomly. In the case $|X|=|Z_X|$, the system can perform an identity transform $F = I_{|X|}$. The system can concatenate those tags with the $|Z_W|$-dimensional word representations into a history of n−1 word and feature representations to be used as an input to the predictive model. POS tag features can be extended to accommodate other types of word features.

Yet another extension relates to incorporating topics models and a long-range dependency of the language model on the current topic, simplified as a dependency on the bag-of-words vocabulary statistics. This context-dependent model extension can enable domain adaptation at a document-level, paragraph-level, and/or other level. When proper document segmentation is not available, such as in broadcast transcripts, a "document" can be defined by considering the last D sentences, assuming that the speakers do not change topic too often. The value for D can be dynamic based on the speaker, based on an agenda, and/or on other factors. For example, if user 1 changes topics very rarely, the value for D can be higher. If user 2 changes topics very frequently, the value for D can be lower. The system can implement a topic model based on the Latent Dirichlet Allocation (LDA), a graphical model that is trained to extract a word-topic matrix from a collection of documents, and that can infer latent topic posterior distributions $\theta_d$ for each test document d. As shown in FIG. 2, the K-dimensional topic vector (where $\Sigma_k \theta_k = 1$) can be used as weights of a mixture model. Because the predictions made by each component of the mixture add-up for the final prediction $\bar{z}_t$, the implementation of the topic-dependent LBL and/or LBLN architecture is an extension of the LBLN-based architectures.

$$\bar{z}_t = \sum_{k=1}^{K} \theta_k (f_C(z_{t-n+1}^{t-1}) + f_{A,B}(z_{t-n+1}^{t-1})) \quad \text{Equation 11}$$

As can be seen below, adding a topic model mixture can benefit language model perplexity.

Now the disclosure turns to sample experimental results summarized as several sets of experiments performed on four distinct datasets aimed at assessing the test set perplexity of the respective language models and at measuring the word accuracy performance for speech recognition tasks. These approaches provide the ability to cluster words with low-dimensional representations.

The experimental results evaluated models on four distinct, public datasets: (1) the Airline Travel Information System (ATIS), a small corpus containing short sentences concerning air travel, (2) the Wall Street Journal (WSJ) set, containing sentences from business news, (3) the Reuters-21578 corpus of business news articles, which is normally used for text categorization, and (4) TV broadcast news transcripts HUB-4 from the Linguistic Data Consortium (LDC) with audio information. Table 2, which is a description of the datasets evaluated in the study, summarizes the statistics of each dataset. |W| is the size of the vocabulary, |X| is the number of POS tags, $T_{tr}$ is the number of training words and $D_{tr}$ is the number of training sentences/documents, $T_{te}$ is the number of test words, and $D_{te}$ is the number of test sentences/documents.

TABLE 2

| Dataset | |W| | |X| | $T_{tr}$ | $D_{tr}$ | $T_{te}$ | $D_{te}$ |
| --- | --- | --- | --- | --- | --- | --- |
| ATIS | 1,311 | 30 | 116k | 11,294 | 23k | 2,369 |
| WSJ | 10,222 | 52 | 1079k | 46,145 | 42k | 2,266 |
| Reuters | 11,742 | 45 | 1,445k | 9,598 | 462k | 3,299 |
| HUB-4 | 25,520 | 34 | 813k | 19,049 | 32k | 827 |

For the WSJ set, the experiments used POS tags to indentify and replace all numbers (tag CD) and proper nouns (tags NNP and NNPS), as well as words with 3 or fewer occurrences, by generic tags, resulting in a considerable reduction in the vocabulary size. For the Reuters set, the experiment split each article into sentences using a Maximum Entropy sentence-splitter, and then tagged each article using the Stanford Log-linear Part-of-Speech Tagger. For the experiment, numbers and rare words (i.e. words appearing less than four times) were replaced with special tags, as well as out-of-vocabulary test words by {unk}. For the HUB-4 corpus, the experiment operated on 100-best hypotheses for each audio file in the test set using a speech recognition system including a trigram language model that was trained on about 813,975 training sentences. In all the experiments but ATIS, 5% of the training data were set apart during learning for cross-validation (the model with the best performance on the cross-validation set was retained). On the ATIS dataset, the best performance on the training set actually corresponded to the best test performance.

Assuming a language model is defined by the conditional probability distribution q over the vocabulary, its perplexity corresponds to a word uncertainty given a context and on a sentence of T words, it is defined as:

$$p = \exp\left(-\frac{1}{T}\sum_{t=1}^{T} \log P(w_t | w_{t-n+1}^{t-1})\right) \quad \text{Equation 12}$$

In the absence of task-specific evaluation, such as word accuracy for speech recognition, perplexity is the measure of choice for language models. Therefore the experiment used perplexity to compare the experimental continuous language models to the state-of-the-art probabilistic n-gram models, including n-gram models that include a back-off mechanism for handling unseen n-grams and the Kneser-Ney smoothing of probability estimates, using an implementation provided by the SRI Language Modeling Toolkit. For each corpus, the experiment selected the n-gram order that minimized the test set perplexity.

The experiments produced an extensive evaluation of many configurations of the LBL-derived architectures and improvements. All the results presented here were achieved in less than 100 learning epochs (i.e. less than 100 passes on the entire training set), and with the set of hyperparameters specified in Table 1.

As can be seen in Tables 3-7, most of the linear and all the non-linear LBL language models are superior to n-grams, as they achieve a lower perplexity. Moreover, using the POS tags lowers the perplexity even more. Conversely, various initializations (random or bi-gram/n-gram SVD-based) or WordNet::Similarity constraints may or may not significantly improve the language model.

Taking advantage of the small size of the ATIS dataset, the experiments were designed to investigate the influence of several hyper-parameters on the performance of the LBL model: the linear model learning rate $\eta_C$, as well as the word embedding learning rate $\eta_R$, the first layer $\eta_A$ and second layer $\eta_B$ nonlinear module learning rates. An exhaustive search on a coarse grid of the above hyper-parameters was performed, assuming an LBL(N) architecture with $|Z_W|=100$ dimensional word representation and $|H|=0, 50, 100$ or $200$ hidden nonlinear nodes, as well as $|Z_X|=0$ or 3 dimensional embedding of POS tag features. The number of hidden nonlinear nodes had a positive influence on the performance, and our addition of POS tags were beneficial to the language model. Regarding the learning rates, the most sensitive rates were $\eta_R$ and $\eta_C$, then $\eta_A$ and finally $\eta_B$. The optimal results were achieved for the hyper-parameter values shown in Table 1. Then the experiments selected the optimal LBLN architecture with $|Z_W|=100$ and $|H|=200$ and further evaluated the joint influence of the feature learning rate $\eta_F$, the graph constraint coefficient $\gamma$, the dimension of the POS tag embedding $|Z_X|$, and the random or bigram initialization of the latent word representations.

In the experiments, the most important factor was $\eta_F$, which needed to be smaller than $10^{-3}$, and the presence or absence of POS features. Larger embedding sizes did not seem to improve the model. Both the type of initializations for R and the strength of the WordNet::Similarity constraint did not yield a substantial impact on the final language model performance, as can be seen in Tables 4-6. As summarized in Table 1, the experiment selected a value of $\eta_F=10^{-4}$ for the feature embedding learning rate and $\gamma=1$ for the graph constraint.

A subsequent set of experiments evaluated the benefit of adding a topic model to the (syntactic) language model, restricted to the Reuters dataset (organized in documents) and to the HUB-4 transcripts, a window of five consecutive sentences is treated as a document. These subsequent experiments used the standard Latent Dirichlet Allocation (LDA) topic model to produce a simplex of topic posteriors $\{\theta_{t,1}, \ldots, \theta_{t,K}\}$ for K=5 topics, for each "document", and used these coefficients as weights of a 5-mixture model. The experiment retained, for each mixture component, the same LBL and LBLN architectures as in the previous experiments, and experimented with adding POS features. As Table 5 suggests, adding a topic model improved the plain LBL perplexity on the Reuters dataset.

TABLE 3

| Method   | Init.  | WordNet | POS $|Z_X|$ | Perplexity |
|----------|--------|---------|-------------|------------|
| KN 4-gram | —     | —       | —           | 13.5       |
| LBL      | —      | —       | —           | 15.19      |
| LBL      | —      | —       | 3           | 14.24      |
| LBLN     | —      | —       | —           | 12.26      |
| LBLN     | bigram | —       | —           | 12.29      |
| LBLN     | —      | yes     | —           | 12.11      |
| LBLN     | —      | —       | 30          | 11.4       |
| LBLN     | bigram | —       | 30          | 11.35      |
| LBLN     | —      | yes     | 30          | 11.29      |
| LBLN     | bigram | yes     | 30          | 11.4       |

Table 3 illustrates language model perplexity results on the ATIS test set. LBLN with 200 hidden nodes, $|Z_W|$=100 dimensions for the word representation and all $|Z_X|$=30 POS tags achieved the lowest perplexity, outperforming the Kneser-Ney 4-gram model.

TABLE 4

| Method   | Init.  | WordNet | POS $|Z_X|$ | Perplexity |
|----------|--------|---------|-------------|------------|
| KN 5-gram | —     | —       | —           | 88.92      |
| LBL      | —      | —       | —           | 87.65      |
| LBLN     | —      | —       | —           | 79.72      |
| LBLN     | bigram | yes     | —           | 78.79      |
| LBLN     | —      | —       | 5           | 76.88      |
| LBLN     | bigram | yes     | 5           | 76.1       |

Table 4 illustrates language model perplexity results on the WSJ test set. A similar architecture to the one in Table 5 outperforms the Kneser-Ney 5-gram model.

TABLE 5

| Method   | Init.  | WordNet | POS $|Z_X|$ | K | Perplexity |
|----------|--------|---------|-------------|---|------------|
| KN 5-gram | —     | —       | —           | — | 80.78      |
| LBL      | —      | —       | —           | — | 78.3       |
| LBLN     | —      | —       | —           | — | 63.92      |
| LBLN     | 5-gram | —       | —           | — | 63.67      |
| LBLN     | —      | yes     | —           | — | 63.22      |
| LBLN     | —      | —       | 5           | — | 60.34      |
| LBLN     | 5-gram | yes     | 5           | — | 60.22      |
| LBL      | —      | —       | —           | 5 | 73.12      |
| LBLN     | —      | —       | —           | 5 | 65.5       |
| LBLN     | —      | —       | 5           | 5 | 61.85      |

Table 5 illustrates language model perplexity results on the Reuters test set. LBLN with 500 hidden nodes, $|Z_W|$=100 dimensions for the word representation and $|Z_X|$=5 dimensions for the 40 POS features, a 5-gram SVD-derived initialization of word representation (init) and WordNet::Similarity constraints achieves the lowest perplexity, far outperforming the Kneser-Ney 5-gram model. Adding a K=5 dimensional topic model based on LDA posteriors (i.e. creating a 5-mixture model of LBL and LBLN) seemed to improve the perplexity of the linear LBL but not of nonlinear LBLN (with the current set of hyperparameters, learning did not converge in 100 epochs).

TABLE 6

| Method           | ASR score | Accuracy | Perplexity |
|------------------|-----------|----------|------------|
| AT&T Watson      | Yes       | 63.7%    | —          |
| Back-off KN 4-gram | —       | 63.5%    | 314.23     |
| LBLN             | —         | 64.1%    | 299.59     |
| LBLN + POS       | —         | 64.2%    | 294.67     |
| LBLN + init      | —         | 64.2%    | 300.97     |
| LBLN + POS + init | —        | 64.2%    | 292.36     |
| "100-best Oracle" | —        | 66.6%    | —          |

Table 6 illustrates speech recognition and language model perplexity results on the HUB-4 task. For each target sentence, the candidate with lowest NLL score from the 100-best hypotheses was chosen. LBLN with 34-dimensional POS tags and 6-gram SVD-derived initialization of word representation (init) achieves the best score and the lowest perplexity, outperforming both the speech recognition and language model baseline, and the Kneser-Ney 4-gram model.

Table 6 presents the results of speech recognition experiments using the language model approaches disclosed herein. The experiments used the AT&T Watson ASR with a trigram language model trained on HUB-4 training set to produce 100-best hypotheses for each of the test audio files of the HUB-4 task. The 1-best and the 100-best oracle word accuracies are 63.7% and 66.6% respectively. The experiment re-ranked the 100-best hypothesis using a range of language models including a 4-gram discrete language model and selected the top ranked hypothesis from each ranked list. The top-ranking hypothesis resulting from LBLN models had significantly better word accuracies than any of the discrete language models. This approach also decreased perplexity when POS tags of a word were included. In order to measure the efficacy of the language model in selecting the correct hypothesis if it were present in the k-best list, the experiment included the reference sentence as one of the candidates to be ranked. As can be seen in Table 7, the approach set forth herein significantly out-performed the best n-gram model on this task as well.

TABLE 7

| Method           | Accuracy |
|------------------|----------|
| Back-off KN 4-gram | 86.9%  |
| LBLN + init      | 90.5%    |
| "100-best Oracle" | 100%    |

Table 7 illustrates speech recognition results on TV broadcast transcripts, using the same training set and test set as in Table 6, but with the true sentence to be predicted included among the n-best candidates.

The disclosure next turns to a discussion of the word embedding experimental results with the Reuters data set. For the visualization of the word embedding, the Reuters corpus is a good choice as it has relatively many words and a small vocabulary, and has one of the best-performing language models, based on POS features. Functionally and semantically similar words are present in the neighborhood of these words, as shown in Table 8 below.

TABLE 8

| debt | aa | decrease | met | slow |
|---|---|---|---|---|
| financing | aaa | drop | introduced | moderate |
| funding | bbb | decline | rejected | lower |
| debts | aa-minus | rise | sought | steady |
| loans | b-minus | increase | supported | slowing |
| borrowing | a-1 | fall | called | double |
| short-term | bb-minus | jump | charged | higher |
| indebtedness | a-3 | surge | joined | break |
| long-term | bbb-minus | reduction | adopted | weaker |
| principal | a-plus | limit | made | stable |
| capital | a-minus | slump | sent | narrow |

Table 8 illustrates the neighborhood of a few selected words, after training the language model and the word embedding. These examples illustrate the 10 closest neighbors in the latent word embedding space on the Reuters dataset, using an LBLN architecture with 500 hidden nodes, $|Z_W|=100$ dimensions for the word representation and $=1Z_X|=5$ dimensions for the POS features representation. The notion of distance between any two latent word vectors was defined as the cosine similarity, but other suitable definitions for distance can be applied as well. Although word representations were initialized randomly and WordNet::Similarity was not enforced, functionally and semantically (e.g. both synonymic and antonymic) close words tended to cluster.

In one variation, the LBL-derived architectures can be implemented in software such as Matlab. The training can be linear in the size of the dataset (i.e. the number of words). The bulk of the computations involve evaluating the word likelihood and in differentiating the loss, which was theoretically linear in the size of the vocabulary $|W|$. However, thanks to numerical libraries such as BLAS and LAPACK, these computations can be sublinear in practice. Typically, training the LBL architectures on moderately sized datasets (WSJ, Reuters and TV broadcasts) would take about a day on a modern multi-core server. Because of the possible bookkeeping overhead that can arise from sampling approximations, or because of the decreased language model performance, i.e. higher perplexity, when hierarchical word representation are used, the experiments can be restricted to the exact solution. Having disclosed some basic system components and concepts, the disclosure now turns to the exemplary method embodiment shown in FIG. 3. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. The system 100 receives a sequence of words and external data associated with the sequence of words (302). Then the system 100 maps each of the sequence of words to a respective X-dimensional vector, wherein the X-dimensional vector corresponds to a size of a vocabulary (304) and processes each respective X-dimensional vector, based on the external data, to generate respective Y-dimensional vectors, wherein each Y-dimensional vector represents a dense continuous space (306). The continuous statistical language model can be based on a long-range dependency of a current topic according to at least one of a paragraph level and a document level. The external data can include part-of-speech tags, topic information, word similarity, a distribution of word relationships, a distribution based on a particular topic, and/or a distribution of possible succeeding parts of speech in a given history. For example, if the high dimensional representation has 50,000 dimensions, the lower dimensional representation can be much smaller, such as 1,000 dimensions. As the dimensionality decreases, the system can operate on the lower dimensional representation more efficiently. Table 2 illustrates some example datasets and representative vocabulary sizes corresponding to the number of dimensions in the representations. In one configuration for generating experimental data, the low dimensional representation has less than 10 dimensions and the high dimensional representation has at least 100 dimensions.

Figure 3:
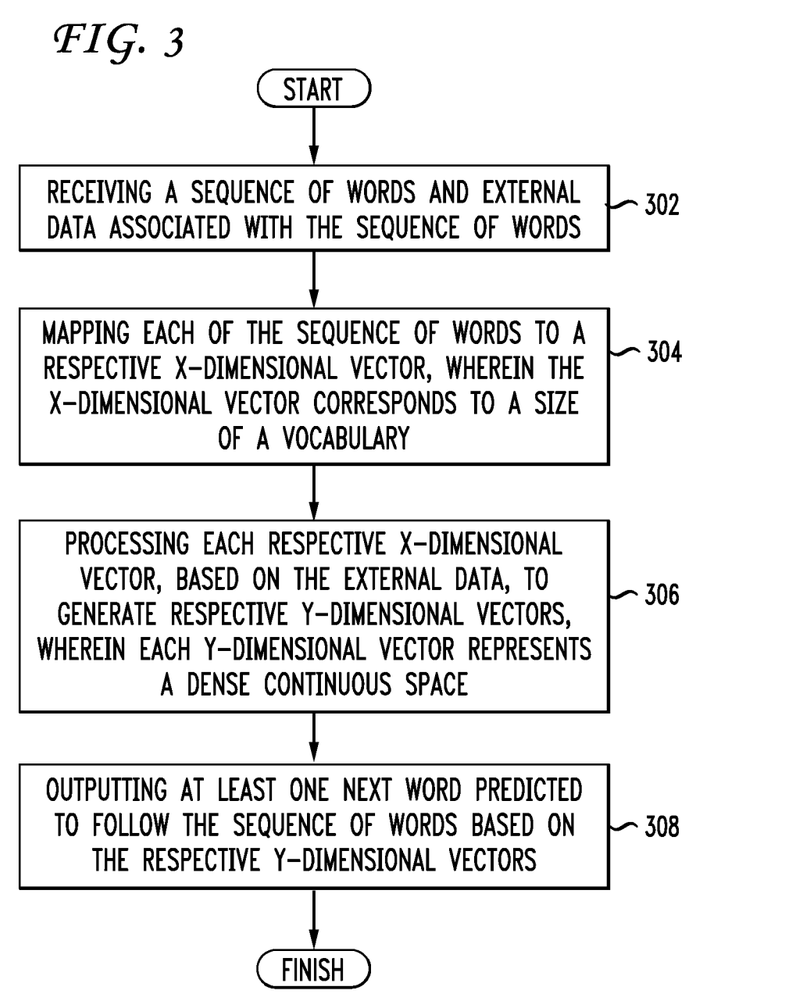
FIG. 3 illustrates an example method embodiment.

The system 100 outputs at least one next word predicted to follow the sequence of words based on the respective Y-dimensional vectors (310). The output can be in visual form, in the form of a data file, a statistical report, and/or some other desired output format. The list of predicted words can be used for a variety of different natural language applications, such as part-of-speech tagging, spelling correction, language generation, and speech recognition. Further, the continuous statistical language model can be based on a long-range dependency of a current topic according to a paragraph level and/or document level. The system 100 can also, for each word of the sequence of words, map discrete part-of-speech tags into the Y-dimensional mapping through a linear operation.

The approaches disclosed herein provide for an energy based statistical language model with a flexible architecture that extends the log-bilinear model. Adding nonlinearity improves predictions of the standard LBL approach significantly. Further, incorporating part-of-speech tags as word features can provide consistent and significant predictive improvements. The model disclosed herein can significantly advance the state-of-the-art and easily bests typical n-gram models on test perplexity, as demonstrated by obtaining better word accuracy on an experimental speech recognition task.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving a sequence of words and external data associated with the sequence of words;
mapping each word of the sequence of words to a respective X-dimensional vector based on interactions of the each word with previous words in the sequence of words, to yield a linear-based probability function comprising the respective X-dimensional vector of each word in the sequence of words, where a X-dimensional size vector corresponds to a size of a vocabulary;
processing, via a processor, each respective X-dimensional vector, based on the external data, to generate Y-dimensional vectors, wherein each Y-dimensional vector represents a non-linear based probability function using non-linear dependencies among the sequence of words based on the external data, and wherein the external data comprises word similarity based on a dot product of a probability of each word in the sequence of words and a probability of any other word in the vocabulary;
linearly mapping, for each word in the sequence of words, a discrete part-of-speech tag into the Y-dimensional vectors, to yield a modified non-linear based probability function;
weighting the linear-based probability function based on a rate of context variation, to yield a weighted linear-based probability function;
weighting the modified non-linear based probability function based on the rate of context variation, to yield a weighted modified non-linear based probability function; and
outputting a predicted next word to follow the sequence of words, the predicted next word predicted using a sum of the weighted linear-based probability function and the weighted modified non-linear based probability function.

2. The method of claim 1, wherein the X-dimensional size vector is a higher dimensional representation than a Y-dimensional size vector.

3. The method of claim 1, wherein the external data further comprises one of topic information, a first distribution of word relationships, a second distribution based on a particular topic, and a third distribution of possible succeeding parts of speech in a given history.

4. The method of claim 1, wherein the predicted next word is used for one of spelling correction, language generation, and speech recognition.

5. The method of claim 1, wherein the size of the vocabulary is at least 10,000 words, and the Y-dimensional mapping is less than 1,000 dimensions.

6. The method of claim 1, wherein the external data further comprises a long-range dependency of a current topic according to one of a paragraph level and a document level.

7. A system comprising:
a processor; and
a computer-readable storage medium having instructions stored which, when executed by the processor, cause the processor to perform operations comprising:
receiving a sequence of words and external data associated with the sequence of words;
mapping each word of the sequence of words to a respective X-dimensional vector based on interactions of the each word with previous words in the sequence of words, to yield a linear-based probability function comprising the respective X-dimensional vector of each word in the sequence of words, where a X-dimensional size vector corresponds to a size of a vocabulary;
processing each respective X-dimensional vector, based on the external data, to generate Y-dimensional vectors, wherein each Y-dimensional vector represents a non-linear based probability function using non-linear dependencies among the sequence of words based on the external data, and wherein the external data comprises word similarity based on a dot product of a probability of each word in the sequence of words and a probability of any other word in the vocabulary; and
linearly mapping, for each word in the sequence of words, a discrete part-of-speech tag into the Y-dimensional vectors, to yield a modified non-linear based probability function;
weighting the linear-based probability function based on a rate of context variation, to yield a weighted linear-based probability function;
weighting the modified non-linear based probability function based on the rate of context variation, to yield a weighted modified non-linear based probability function; and
outputting a predicted next word to follow the sequence of words, the predicted next word predicted using a sum of the weighted linear-based probability function and the weighted modified non-linear based probability function.

8. The system of claim 7, wherein the X-dimensional size vector is a higher dimensional representation than a Y-dimensional size vector.

9. The system of claim 7, wherein the external data further comprises one of topic information, a first distribution of word relationships, a second distribution based on a particular topic, and a third distribution of possible succeeding parts of speech in a given history.

10. The system of claim 7, wherein the predicted next word is used for one of spelling correction, language generation, and speech recognition.

11. The system of claim 7, wherein the size of the vocabulary is at least 10,000 words, and the Y-dimensional mapping is less than 1,000 dimensions.

12. The system of claim 7, wherein the external data further comprises a long-range dependency of a current topic according to one of a paragraph level and a document level.

13. A computer-readable storage device having instructions stored which, when executed by a computing device, cause the computing device to perform operations comprising:
receiving a sequence of words and external data associated with the sequence of words;
mapping each word of the sequence of words to a respective X-dimensional vector based on interactions of the each word with previous words in the sequence of words, to yield a linear-based probability function comprising the respective X-dimensional vector of each word in the sequence of words, where a X-dimensional size vector corresponds to a size of a vocabulary;
processing each respective X-dimensional vector, based on the external data, to generate Y-dimensional vectors, wherein each Y-dimensional vector represents a non-linear based probability function using non-linear dependencies among the sequence of words based on the external data, and wherein the external data comprises word similarity based on a dot product of a probability of each word in the sequence of words and a probability of any other word in the vocabulary; and
linearly mapping, for each word in the sequence of words, a discrete part-of-speech tag into the Y-dimensional vectors, to yield a modified non-linear based probability function;
weighting the linear-based probability function based on a rate of context variation, to yield a weighted linear-based probability function;
weighting the modified non-linear based probability function based on the rate of context variation, to yield a weighted modified non-linear based probability function; and
outputting a predicted next word to follow the sequence of words, the predicted next word predicted using a sum of the weighted linear-based probability function and the weighted modified non-linear based probability function.

14. The computer-readable storage device of claim 13, wherein the X-dimensional size vector is a higher dimensional representation than a Y-dimensional size vector.

15. The computer-readable storage device of claim 13, wherein the external data further comprises one of topic information, a first distribution of word relationships, a second distribution based on a particular topic, and a third distribution of possible succeeding parts of speech in a given history.

16. The computer-readable storage device of claim 13, wherein the size of the vocabulary is at least 10,000 words, and the Y-dimensional mapping is less than 1,000 dimensions.

17. The computer-readable storage device of claim 13, wherein the external data further comprises a long-range dependency of a current topic according to one of a paragraph level and a document level.

* * * * *